US006948765B2

(12) United States Patent
Tong et al.

(10) Patent No.: US 6,948,765 B2
(45) Date of Patent: Sep. 27, 2005

(54) LOCK MECHANISM FOR A ROTARY DOOR OPERATOR

(75) Inventors: Haibo Tong, Palatine, IL (US); Marianne Krbec, Elmhurst, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 18 days.

(21) Appl. No.: 10/744,919

(22) Filed: Dec. 23, 2003

(65) Prior Publication Data

US 2005/0134083 A1 Jun. 23, 2005

(51) Int. Cl.[7] .................................................. B60J 5/00
(52) U.S. Cl. ...................................... 296/146.4; 49/280
(58) Field of Search ............................. 296/146.4, 106, 296/146.8; 16/58, 50; 70/208, 215, 224, 70/277, 210, 237; 187/310; 292/216, 144, 292/95, 336.3, 201, 202, 199; 49/281, 280, 49/255, 253; 244/129.5

(56) References Cited

U.S. PATENT DOCUMENTS 3,559,232 A * 2/1971 Crane ............................ 16/50
4,282,686 A * 8/1981 Britzke et al. ................ 49/253
4,545,149 A * 10/1985 Jentsch ........................ 49/280
4,833,827 A * 5/1989 Bode et al. .................... 49/280
4,854,223 A * 8/1989 Fink ............................ 49/280
5,146,713 A * 9/1992 Grafius ........................ 49/255
6,141,908 A * 11/2000 Bowen ........................ 49/281
6,457,674 B2 * 10/2002 Erben et al. ............. 244/129.5
6,676,190 B2 * 1/2004 Daniels et al. ........... 296/146.4
2002/0000493 A1 * 1/2002 Erben et al. ............. 244/129.5
2004/0041413 A1 * 3/2004 Stojc ........................... 292/95
2004/0079593 A1 * 4/2004 Karner et al. ............... 187/310
2004/0160065 A1 * 8/2004 Stojc .......................... 292/144

* cited by examiner

*Primary Examiner*—Kiran B. Patel
(74) *Attorney, Agent, or Firm*—The Webb Law Firm

(57) ABSTRACT

A lock mechanism for a rotary door operator of a transit vehicle includes a lock member pivotally connected to a block cylinder and pivotally connected to a mounting bracket. Such lock member is rotatable in a locking direction to a predetermined position under a block member connected to the output shaft for preventing an axial linear movement of the door post which is connected to a door during the loss of fluid pressure. The block cylinder rotates the lock member to an unlocking position during normal operation to enable opening of the door. A lock sensing switch provides a feedback on the lock condition to the transit vehicle control system.

23 Claims, 6 Drawing Sheets

LOCK MECHANISM FOR A ROTARY DOOR OPERATOR

CROSS-REFERENCE TO CO-PENDING APPLICATIONS

This application is closely related to co-pending application U.S. Ser. No. 10/744,038 entitled “Unlock Mechanism for a Rotary Door Operator”, to co-pending U.S. Ser. No. 10/744,041 entitled “Rotary Door Operator”, filed concurrently herewith. These applications being assigned to the assignee of the present invention and the disclosures of these co-pending applications are hereby incorporated by reference thereto.

FIELD OF THE INVENTION

The present invention relates, in general, to transit vehicle door systems and, more particularly, the instant invention relates to a rotary door operator and, yet more particularly, the instant invention relates to a rotary door operator having a “zero-lead” or a “Lift and Lock” locking feature.

BACKGROUND OF THE INVENTION

Prior to the development of the present invention, as is generally well known in the art, a rotary door operator is mainly used in the inter-city bus coaches. These rotary operators are available in two distinct types, commonly referred to as zero-lead and lift-and-lock. Either door operator type can be adapted for use with pneumatic or hydraulic fluids.

The rotary operator of the zero-lead type converts piston motion of a piston-power cylinder unit into a rotary motion by means of roller pairs engaging oblique slots with an axial direction at their ends. One of the cylinders within the piston-power cylinder unit is connected to the power output shaft that, in turn, is connected to a door of the vehicle. During the door closing cycle, the power shaft moves upwardly in the vertical direction. When the door reaches a closed position, the roller pairs disposed at the end of the axial portions provide rudimentary locking of the door providing that the piston-power cylinder unit is charged with fluid and that no leakage occurs.

The rotary door operator of the lift-and-lock type comprises a double acting drive cylinder driving an output shaft coupled to the door post. The output shaft has a splined shaft member connected to the cylinder through a helical ball cage in order to provide a rotary motion and engageable with the door post carrying the door. The output shaft also has an antirotational shaft member enabling vertical movement of the output shaft to lock and unlock the door. When the door reaches the closed position, the rotary door operator lifts the door post and, subsequently, the door connected to the door post by approximately 10 mm, enabling door mounted wedges to engage mating wedges mounted adjacent a portal aperture of the transit vehicle. In the opening direction, the output shaft first moves in a downward direction disengaging the wedges and enabling rotation of the door post.

To close the transit vehicle door, the drive cylinder is charged with fluid pressure through the first orifice. The rate at which the door closes depends solely on the rate at which the cylinder is charged with fluid. The splined shaft member connected with a drive cylinder piston moves linearly in the upward direction while engaging an antirotational shaft member. Such upward motion of the output shaft causes rotation of the post in the first direction and, more particularly, causes the closing motion of the door.

To open the transit vehicle doors, the drive cylinder is charged with fluid pressure through the second orifice. The rate at which the door opens depends solely on the rate at which the cylinder is charged with air. The output shaft moves linearly in the downward direction and causes rotation of the splined shaft in the second direction to open the door.

Such lift-and-lock feature is the mechanism disposed within the door operator preventing the un-locking of the door. When such door contacts door jambs of the door portal aperture, the mounting linkage attached to the door at one end and attached to such door operator at the distal end stops rotating. Since the cylinder has not reached the end of the stroke, the output shaft continues to move upward lifting such door and enabling door locking wedges to substantially engage mating locking wedges disposed adjacent the portal aperture.

One of the main disadvantages of these designs is that loss of fluid pressure will cause downward movement of the door, thus disengaging such mating wedges in lift-and-lock applications or simply unlock the door in zero-lead applications and, more particularly, loss of fluid pressure will create a hazardous condition due to an unlocked door.

To overcome the aforementioned concern associated with fluid pressure loss, lock mechanisms have been employed in such rotary door operators.

U.S. Pat. No. 5,545,149 to Jentsch teaches a lock mechanism for lift-and lock door operator type. Such lock mechanism employs a support member positioned under a disk that is permanently attached to the output shaft and an unlocking member which engages such support to prevent its rotation in the unlocking direction. In the door locked position, the disk rests on the support member thus preventing downward movement of the output shaft. The support member incorporates adjustment means to maintain a contact with the disk. The unlocking member is connected to a unlock cylinder. To unlock the door in a normal operation, the unlock cylinder is energized causing rotation of the unlocking member which enables the support member to rotate in the unlocking direction and, more particularly, enables the output shaft to move downwardly and disengage the door wedges.

There are several disadvantages related to this type of lock mechanism. In the first aspect, the disk rests on the support member creating a frictional force that must be overcome during door unlocking movement. In the second aspect, the engagement between support member and the unlocking member, as best understood, creates an additional frictional force. As it is well known in the art, presense of frictional forces causes premature wear and reduces reliability of the design.

U.S. Pat. No. 4,854,223 to Fink teaches a lock mechanism for zero-lead rotary door operator. Such lock mechanism utilizes a blocking lever preventing movement of the roller pair only when fluid pressure loss occurs. The blocking lever is connected to the spring loaded rod of the lock cylinder. In normal operation, the lock cylinder is charged at all times to maintain the blocking lever in the unlock position additionally compressing its internally mounted spring.

There are several disadvantages related to this type of lock mechanism. In the first aspect, if the fluid pressure loss occurs only in regards to the piston-power cylinder unit and not to the lock cylinder, the door will unlock as the blocking lever is maintained in the normal unlock position. In the second aspect, the blocking in the fluid pressure line leading to the lock cylinder may cause late movement of the blocking lever enabling the roller pair to move downwardly and further enabling unlocking of the doors.

As it can be seen from the above discussion there is a need for a relatively simple and reliable mechanical lock mechanism for the rotary door operator.

SUMMARY OF THE INVENTION

The present invention provides a simple lock mechanism for the rotary door operator of a transit vehicle. It consists of a block member stationarely mounted on the output shaft of the rotary door operator, a lock member pivotally mounted in relathionship to the block member, and a lock cylinder having a piston shaft with a pivotal connection to the lock member. At the end of the door closing motion, as the rotary door operator lifts the door to engage door wedges with portal wedges, a bias spring disposed within the lock cylinder urges the piston shaft to extend and rotate the lock member in the locking direction to a predetermined distance below the underneath surface of such block member. In its final locking position, the lock member is disposed in an overcenter condition to prevent unintended door unlocking in the case where both the fluid pressure is lost to the drive cylinder other than due to the manual release actuation and the spring of the lock cylinder fails. A lock sensing switch provides a feedback of the lock condition to the transit vehicle control system.

OBJECTS OF THE INVENTION

It is, therefore, one of the primary objects of the present invention to provide a simple and reliable lock mechanism for a rotary door operator.

It is another object of the present invention to provide a lock mechanism for a rotary door operator which requires fewer components.

It is a further object of the present invention to provide a lock mechanism for a rotary door operator which incorporates friction reducing provisions.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
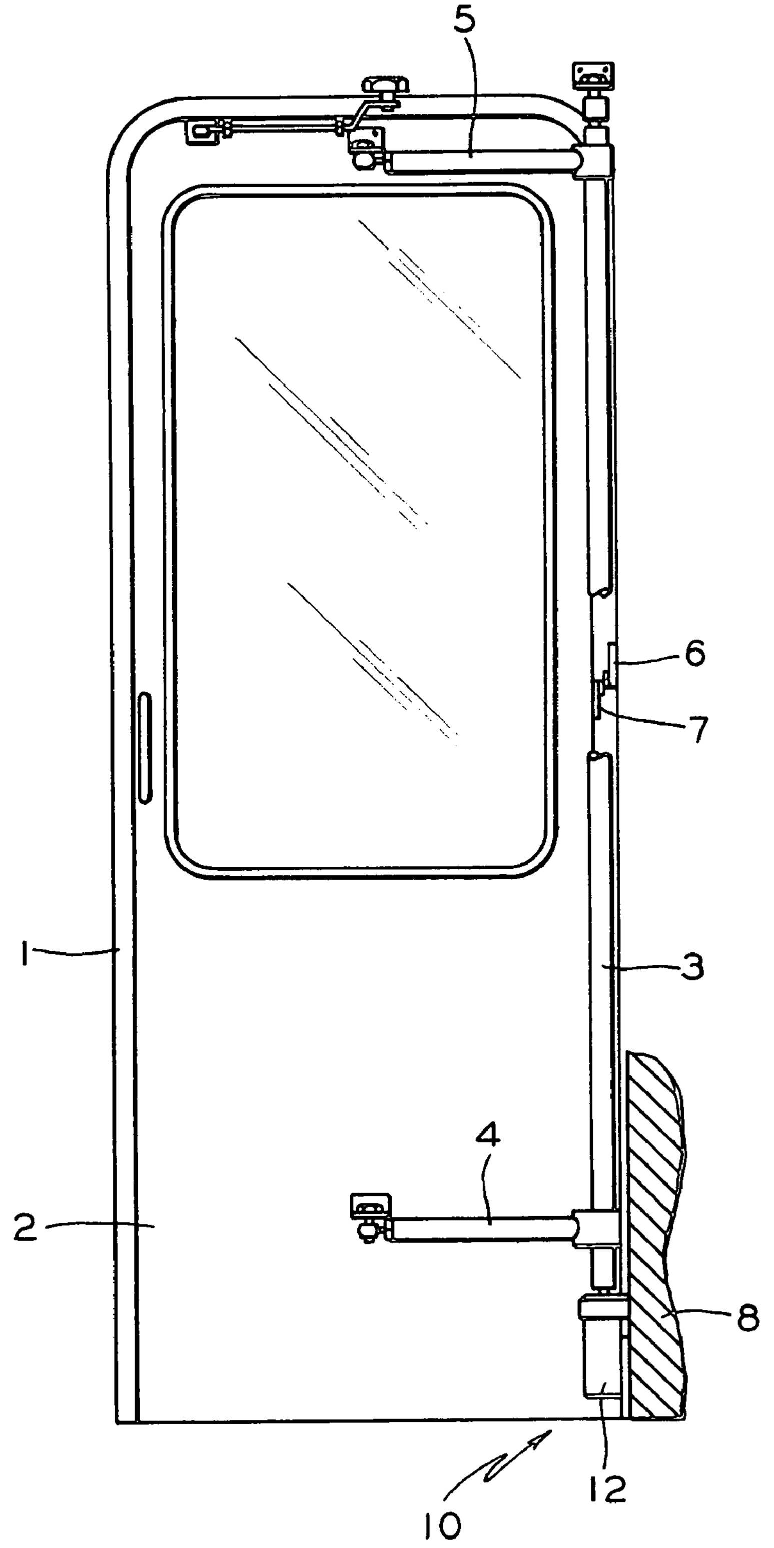
FIG. 1 is a plan view of a typical door system utilizing rotaty door operator.

BRIEF DESCRIPTION OF THE PREFERRED AND ALTERNATIVE EMBODIMENTS OF THE PRESENT INVENTION

Before describing the invention in detail, the reader is advised that, for the sake of clarity and understanding, identical components having identical functions have been marked where possible with the same reference numerals in each of the Figures provided in this document.

The invention disclosed herein overcomes locking device application difficulties through the use of a simple locking member rotatable to a predetermined position to prevent downward movement of the rotary door operator components during a loss of fluid pressure. The use of a simple rotatable locking member eliminates the need for multiple and more complex moving components. An additional advantage of the present invention is that the locking member does not engage the output shaft in a locked position, thereby reducing surface wear and, more particularly, extending the life of the lock mechanism. The design, therefore, provides the advantage of reliable operation and reduced manufacturing costs.

For the sake of brevity, the structure and operation of the lock mechanism will be described in application with the lift-and-lock rotary door operator. Those skilled in the art will readily understand that the operation of the lock mechanism in combination with a zero-lead rotary door operator will be identical except for the amount of vertical movement of the output shaft prior to and after the door post rotation and further in a method of achieving rotary and axial motion related to the internal components of the rotary drive operator.

Figure 2:
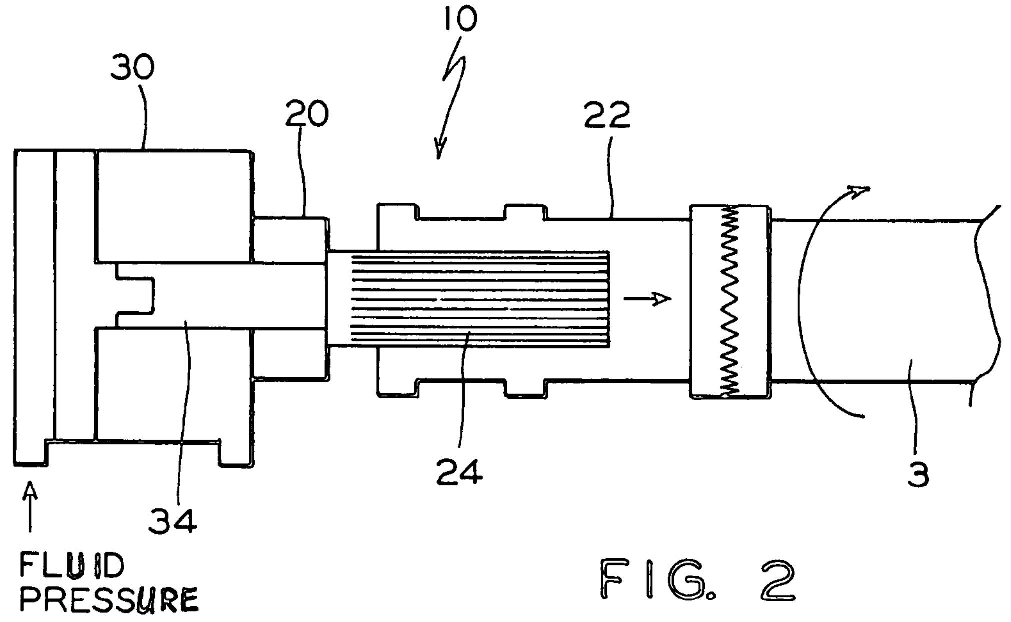
FIG. 2 is a diagramatic view of the rotary door operator.
Figure 8:
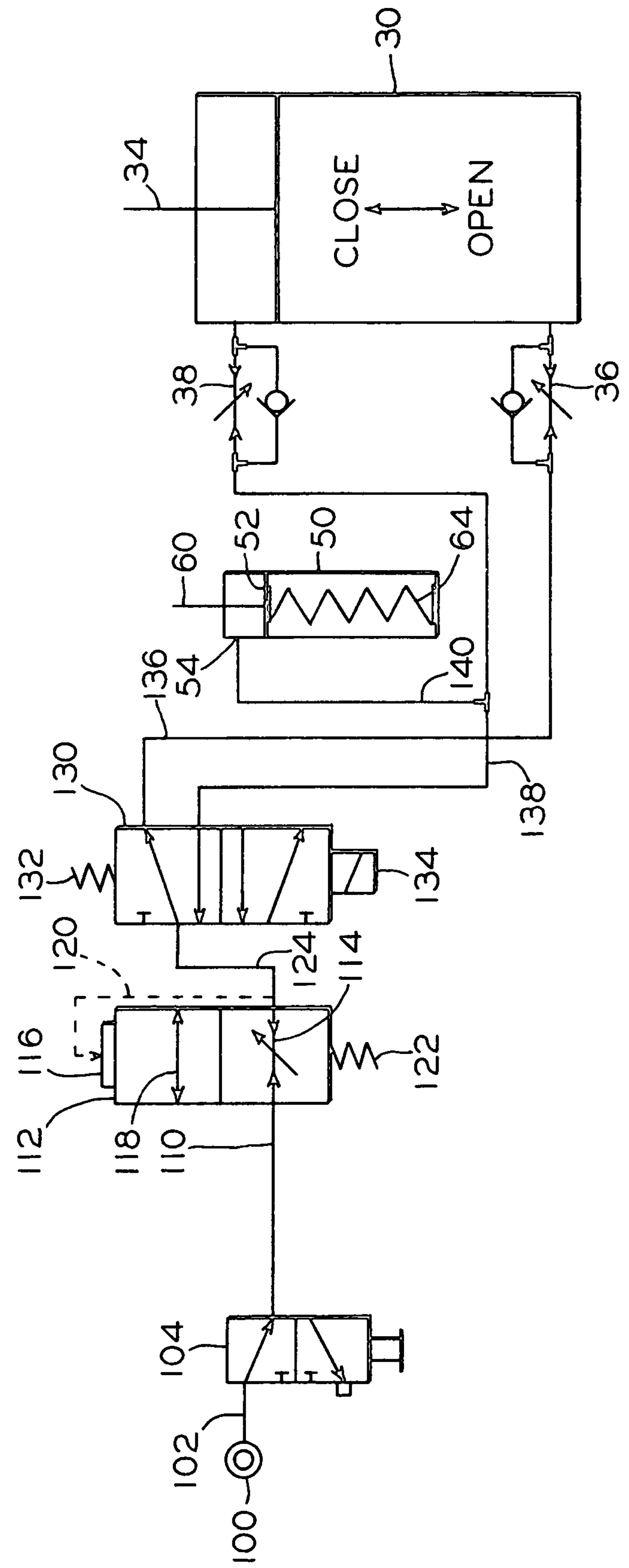
FIG. 8 is a schematic diagram of the control system arrangement of the present invention.

The reader's attention is directed to FIGS. 1, 2, and 8, wherein is illustrated a typical door system which utilizes a rotary door operator, generally designated 10. Such door system typically comprises a door 2 disposed within a portal aperture 1 of a transit vehicle (not shown). The door 2 is supported by first and second arms 4 and 5 respectively which are attached to a well known door post 3. The door post 3 is pivotally attached to the transit vehicle structure 8 at one end and pivotally attached to the rotary door operator 10 at a distal end. Such rotary door operator 10 enables a rotation of the door post 3 and further enables a movement of the door 2 in a closing and an opening direction. A stationary wedge element 6 attached to the transit vehicle structure 8 and a movable wedge element 7 attached to the door 2 and engaging such stationary wedge element 6 are provided for locking the door 2 in a closed position.

Figure 6:
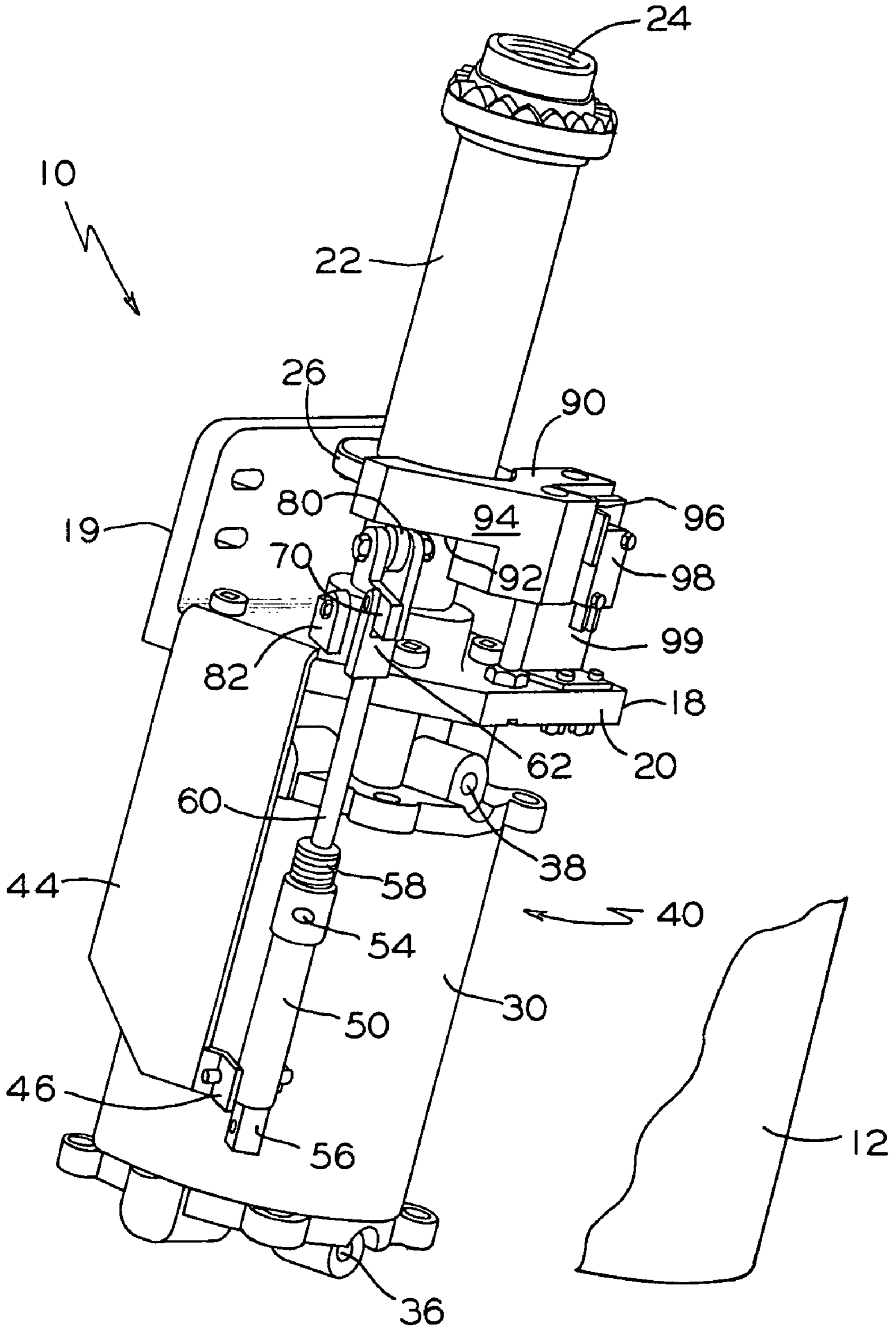
FIG. 6 is a perspective view of the lock mechanism, according to the presently preferred embodiment of the instant invention.

The rotary door operator 10, best illustrated in FIGS. 2 and 6, comprises an operator mounting bracket 20 having a first surface portion 19 for attachment thereof to a transit vehicle structure 8. A drive cylinder 30, is attached to such operator mounitng bracket 18 at a second surface portion 20 thereof. A piston rod 34 is adapted for reciprocal motion within the drive cylinder 30. First and second adjustable restricted orifices 36 and 38 respectively are provided for supplying and evacuating fluid pressure to and from the drive cylinder 30 to enable closing and opening of the door 2. An output shaft 22 is connected to the door post 3. A splined shaft member 24 is engaged with the output shaft 22 at one end and is connected to the piston shaft 34 at a distal end. A cover 12 is generally provided to enclose the rotary door operator 10 for safety to passengers and for aesthetic purposes.

The lock mechanism, generally designated 40, is best illustrated in FIGS. 3–7. In a particular reference to FIG. 3, such lock mechanism 40 includes a first abutment means 26 secured to the output shaft 22 for axial movement therewith and a first blocking means 50 adapted for preventing an axial vertical movement of the first abutment means 26 during the loss of fluid pressure 100 to the drive cylinder 30.

In the presently preferred embodiment such first blocking means 50 is a block cylinder 50 having an attachment means, such as first threaded end 58 for a threaded engagement with the second surface portion 20 of the mounting bracket 18 at a threaded aperture 21. A shaft 60 connected to the piston 52 at one end is adapted for reciprocal motion in a locking direction by a first biasing means 64 and in an unlocking direction by the fluid pressure 100 supplied through the fluid communication means such as an orifice 54. The distal end of the shaft 60 is attached to a blocking member 62. In the locked condition such blocking member 62 is disposed at a first predetermined distance 84 from the bottom surface of the first abutment means 26. The first biasing means 64 may be mounted externally to the block cylinder 50 but preferably the first biasing means 64 is disposed within the block cylinder 50 adjacent the piston 52 opposite of the shaft 60. In a preferred embodiment of the present invention such first biasing means 64 is a bias spring 64.

In an alternative embodiment, such first blocking means 50 may be attached to the transit vehicle structure 8.

To lock the door 2, the fluid pressure 100 is supplied to the drive cylinder through the orifice 36 causing an upward movement of the output shaft 22. The supply of fluid pressure 100 is terminated to the block cylinder 50 enabling the shaft 60 to move upwardly due to the first biasing means 64 and further enabling disposition of the blocking member 62 underneath the first abutment means 26. To unlock the door 2 under a normal operation, the fluid pressure 100 is supplied through the orifice 54 to move the shaft 60 in the unlocking direction and enable axial linear movement of the output shaft 22 upon activation of the drive cylinder 30 in the opening direction enabled by the supply of fluid pressure through orifice 38. The fluid pressure 100 can be of hydraulic or pneumatic nature. In the presently preferred embodiment the fluid pressure 100 is pneumatic.

In another alternative embodiment such first blocking means 50 is an electrical solenoid having a solenoid shaft 60 attached to the blocking member 62 and a first biasing means 64 urging the solenoid shaft 60 into the locking position. Those skilled in the art will understand that the solenoid shaft 60 will function equivalently to the shaft 60 in the present invention.

Figure 4:
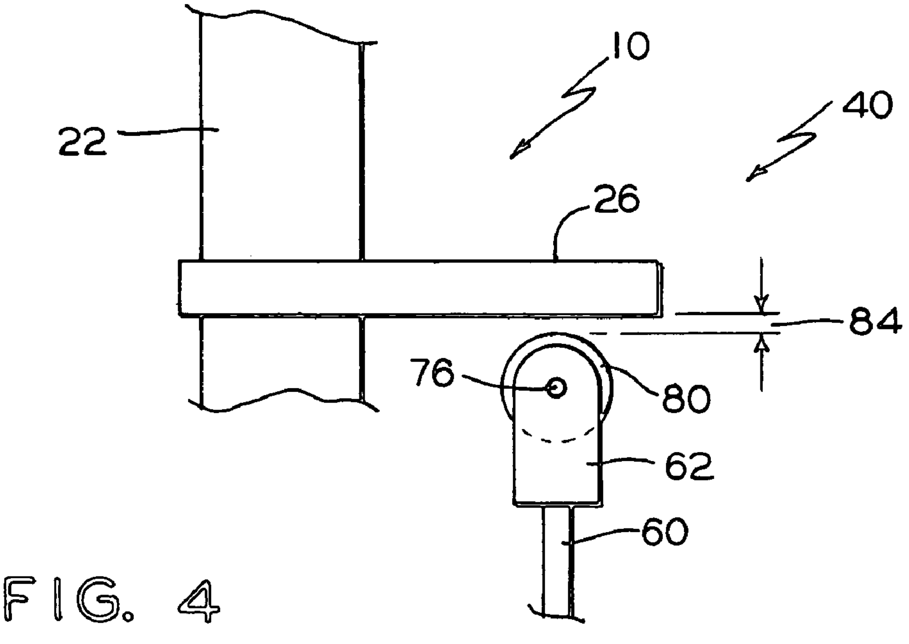
FIG. 4 is an elevation view of the lock mechanism, according to a second embodiment of the present invention.

Since the output shaft 22 will move linearly upon the loss of fluid pressure 100 to the drive cylinder 30, a roller 80, best illustrated in FIG. 4, is adapted for pivotal movement in respect to the blocking member 62 at a pivot 76 thereof.

Figure 5:
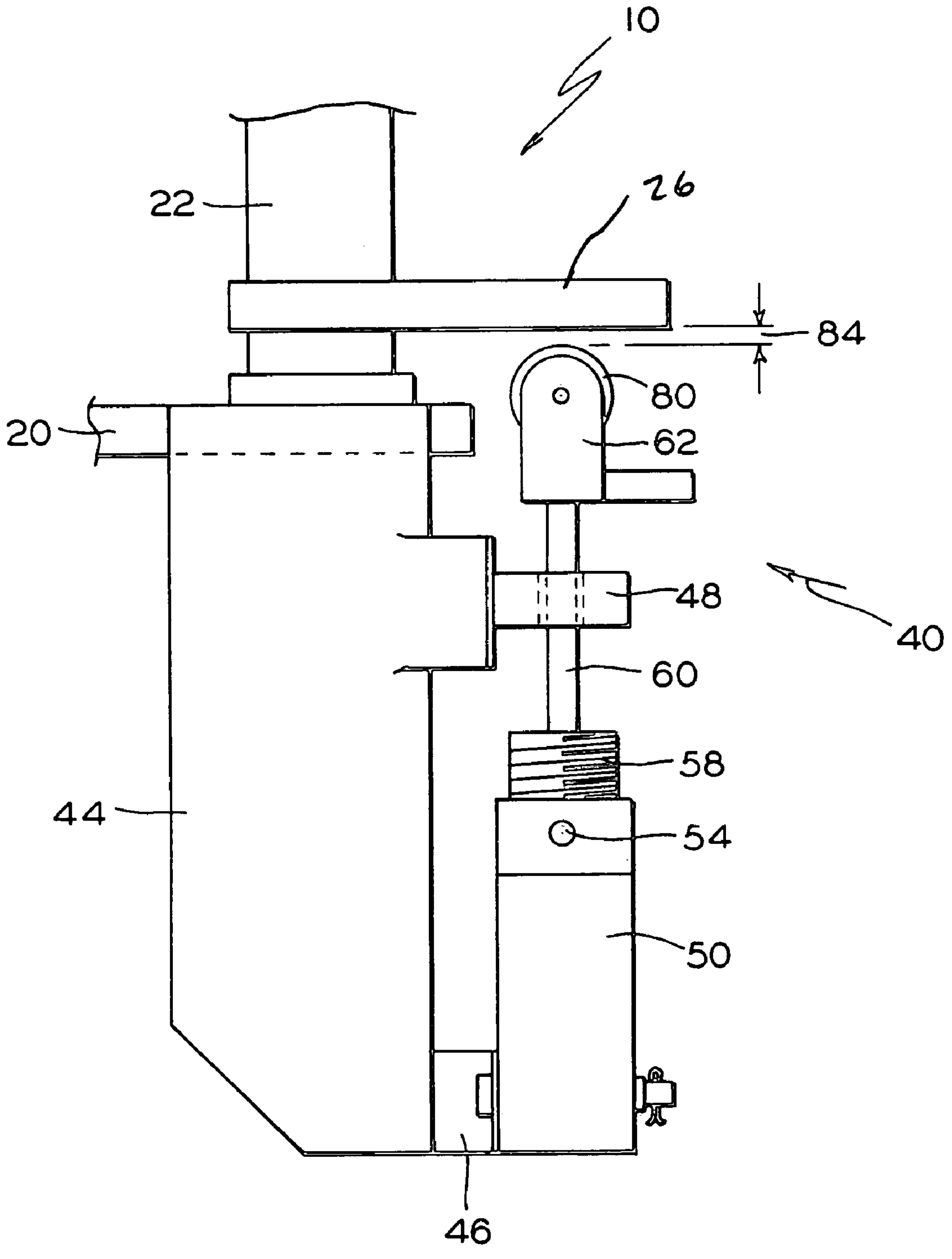
FIG. 5 is an elevation view of the lock mechanism, according to a third embodiment of the present invention.

In a presently preferred embodiment of the present invention, best illustrated in FIG. 5, a block cylinder 50 is attached at mounting portions 46 and 48 of a mounting member 44 which is in turn attached to the second surface portion 20 of the mounting bracket 20. Such second mounting portion 48 may be a guide encasing a shaft 60.

Alternatively, such mounting member 44 may be attached to a transit vehicle structure 8 or to the first surface portion 19 of the mounting bracket 18.

Figure 7:
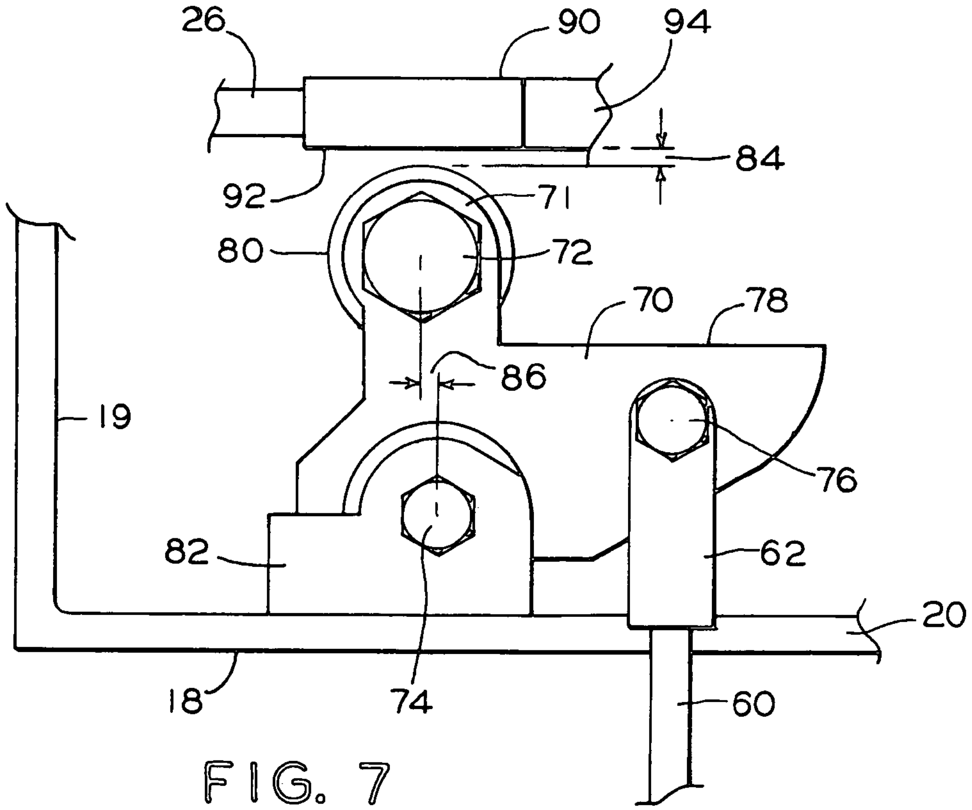
FIG. 7 is an elevation view particluraly showing disposition of the second blocking means of the preferred embodiment of the present invention.
Figure 3:
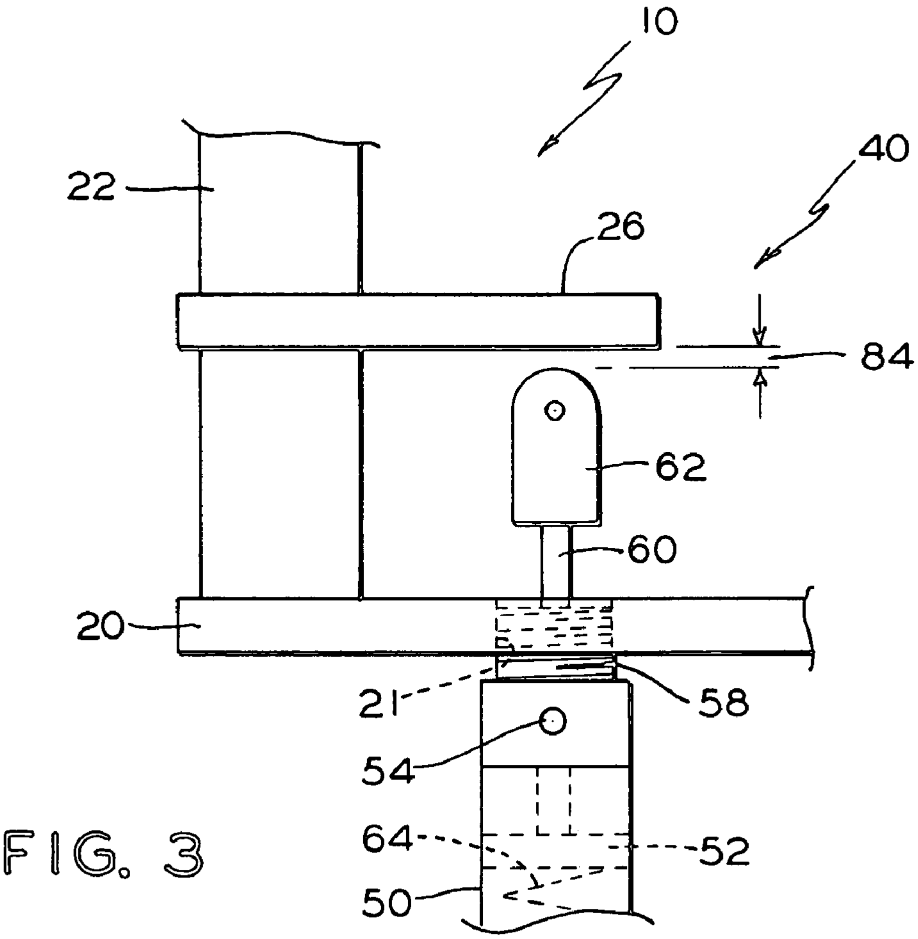
FIG. 3 is a side elevation view of the lock mechanism, according to a first embodiment of the present invention.

In the most preferred embodiment of the instant invention, as best illustrated in FIGS. 6 and 7, the lock mechanism 40 comprises a second blocking means 70 and a second abutment means 90. The second blocking means 70 is pivotally attached to at least one mounting tab 82 at a second pivot 74 and pivotally attached to the blocking member 62 at a third pivot 76. The at least one mounting tab 82 may be integral to the mounting member 44 but preferably is integral to the second surface portion 20 of the mounting bracket 18. As best illustrated in FIG. 7, at least one portion 71 of the second blocking means 70 is adapted for blocking the axial linear movement of the output shaft 22. The second blocking means 70 further has a first pivot 72 disposed adjacent the at least one portion 71. The first pivot 72 and a second pivot 74 are spaced in respect to the vertical axis by a second predtermined distance 86 to form what is well known as an overcenter locking condition. In this condition the unintended axial linear movement of the output shaft 22 would prevent rotation of the second blocking means 70 in the unlocking direction and, more importantly, would prevent unintended unlocking of the door 2.

The second abutment means 90 includes a first surface 92, generally horizontally disposed, and an adjacent second surface 94, typically vertically disposed, for maintaining the second blocking means 70 in the unlocking position during door 2 opening. A third surface 96 may be provided for engaging at least one electrical switch 98 for feedback of the lock condition to a control system (not shown) of the transit vehicle.

Friction reducing means attached to the second blocking means 70 are provided to minimize friction upon engagement and disengagement thereof with the second abutment means 90. In the presently preferred embodiment such friction reducing means is a metallic roller 80 attached to the second blocking means 70 at a first pivot 72. Alternatively, such friction reducing means can be a simple polymer roller or the at least one portion 71, which is coated with friction reducing materials including but not limited to teflon and nylon.

In a particular reference to FIG. 8, a supply valve 104 disposed within the transit vehicle will enable supply of the fluid pressure 100 through lines 102 and 110 into a control circuit of the rotary door 2 operator. A novel feature of the present invention is employment of a slow start valve 112 for controlling intial flow rate of the fluid pressure 100. At first, the fluid pressure 100 will flow through a restricted orifice 114 of the slow start valve 112 into a control valve 130 through the line 124. At the same time the fluid pressure 100 will flow through the line 120 into a pilot 116 of the slow start valve 112. When the fluid pressure 100 reachs a predetermined level inside the pilot 116, the slow start valve 112 will shift and enable fluid pressure 100 flow through an unrestricted orifice 116. The control valve 130 which is biased by spring 132 will enable the fluid pressure 100 to flow through line 136 to the first orifice 36 of the drive cylinder 30 thus enabling closing of the door 2.

To open the door 2 a signal sent to a pilot 134 of the control valve 130 will shift thereof to enable the flow of the fluid pressure 100 to the second orifice 38 of the drive cylinder 30 through the line 138 thus enabling movement of the door 2 in the opening direction. At the same time the fluid pressure 100 will be supplied to the orifice 54 of the block cylinder 50 through the line 140. Since the block cylinder 50 is selected to be smaller in size than the drive cylinder 30 it will actuate first thus rotating the second blocking means 70 in the unlocking direction for enabling axial linear movement of the output shaft 22 and, more importantly, allowing opening of the door 2 driven by the drive cylinder 30.

In applications employing an electrical solenoid as a first blocking means, an electrical signal that is required to activate solenoid 134 of the control valve 130 will be adapted to power electrical solenoid 50 during the opening cycle of the door 2.

While the presently preferred and alternative embodiments of the instant invention have been described in detail above in accordance with the patent statutes, it should be recognized that various other modifications and adaptations of the invention may be made by those persons who are skilled in the relevant art without departing from either the spirit of the invention or the scope of the appended claims.

We claim:

1. A lock mechanism for a rotary door operator for opening and closing a door of a transit vehicle door system, said rotary door operator having a mounting bracket with a first surface portion for attachment to a structure of such transit vehicle and a second surface portion, a drive cylinder enabled by a source of fluid pressure, at least an output shaft connected to a piston of said drive cylinder for reciprocal movement therewith, said lock mechanism comprising:

(a) an abutment means secured to said output shaft for axial movement therewith;

(b) a blocking means for blocking an axial linear movement of said abutment means during an unintended loss of said fluid pressure to said drive cylinder;

(c) a blocking member attached to said blocking means, said blocking member disposed at a first predetermined distance from a bottom surface of said abutment means in a locked position; and (d) a biasing means engageable with said blocking member for urging said blocking member toward said locked position, said biasing means disposed in one of an internal and external location in respect to said blocking means.

2. A lock mechanism for a rotary door operator according to claim 1 wherein said block cylinder having an orifice disposed at one end for receiving a supply of said fluid pressure, a lock piston adapted for motion in a locking direction by said biasing means, said lock piston adapted for motion in an unlocking direction by said fluid pressure, a shaft attached to said lock piston at one end and to said blocking member at a distal end, and an attachment means for attachment to one of said mounting bracket and such structure of such transit vehicle.

3. A lock mechanism for a rotary door operator according to claim 2 wherein said fluid pressure is one of pneumatic and hydraulic.

4. A lock mechanism for a rotary door operator according to claim 1 wherein said attachment means include a threaded end engaging a threaded aperture disposed within one of said mounting bracket and such structure of such transit vehicle.

5. A lock mechanism for a rotary door operator according to claim 1 further including a roller pivotally attached to said blocking member at a pivot thereof, said roller disposed at a predetermined distance from a bottom surface of said abutment means in said locked position, said roller is one of a metallic and a polymer.

6. A lock mechanism for a rotary door operator according to claim 1 wherein said first blocking means is attached to a first mounting portion of a mounting member, said mounting member attached to one of said mounting bracket and such structure of such transit vehicle.

7. A lock mechanism for a rotary door operator according to claim 6 wherein said mounting member further includes a second mounting portion for guiding said shaft of said first blocking means.

8. A lock mechanism for a rotary door operator for opening and closing a door of a transit vehicle door system, said rotary door operator having a mounting bracket with a first surface portion for attachment to a structure of such transit vehicle and a second surface portion, a drive cylinder enabled by a source of fluid pressure, at least an output shaft connected to a piston of said drive cylinder for reciprocal movement therewith, said lock mechanism comprising:

(a) a first abutment means secured to said output shaft for axial movement therewith;

(b) a first blocking means engageable with said first abutment means for blocking an axial linear movement of said first abutment means during an unintended loss of said fluid pressure to said drive cylinder, said first blocking means is one of a cylinder and a solenoid;

(c) a blocking member attached to said first blocking means, said blocking member disposed at a first predetermined distance from a bottom surface of said first abutment means in a locked position;

(d) at least one mounting tab;

(e) a second blocking means having at least one portion, said second blocking means pivotally attached to said mounting tab at a second pivot, said second blocking means pivotally attached to said blocking member at a third pivot, said at least one first portion disposed underneath said first abutment means in a locked position for preventing a predetermined axial linear movement of said output shaft sufficient to open such door, said second blocking means is rotatable to an unlocked position by said first blocking means for enabling said predetermined axial linear movement of said output shaft to open such door; and (f) a biasing means engageable with said second blocking means for urging said second blocking means toward said locked position, said biasing means disposed in one of an internal and external location in respect to said first blocking means.

9. A lock mechanism for a rotary door operator according to claim 8 further including a second abutment means having a first surface disposed adjacent said at least one first portion of said second blocking means at a first predetermined distance in said locked position, a second surface for urging said at least one first portion in said unlocked position and a third surface.

10. A lock mechanism for a rotary door operator according to claim 8 further including friction reducing means disposed at said at least one portion for minimizing friction upon engagement and disengagement thereof with said second abutment means.

11. A lock mechanism for a rotary door operator according to claim 10 wherein said friction reducing means is one of a roller pivotally attached to a first pivot disposed near said at least one portion and a polymer material with a predetermined coefficient of friction applied to said at least one portion.

12. A lock mechanism for a rotary door operator according to claim 11 wherein said roller disposed at a first predetermined distance from said first surface of said second abutment means in said locked position, said roller is one of metallic and a polymer.

13. A lock mechanism for a rotary door operator according to claim 11 wherein said polymer material is one of teflon and nylon.

14. A lock mechanism for a rotary door operator according to claim 11 wherein said first pivot is disposed at a second predetermined distance from said second pivot, said second predetermined distance enabling further rotation of said second blocking means to said locked position upon unintended axial linear movement of said output shaft caused by unintended loss of said fluid pressure to said drive cylinder.

15. A lock mechanism for a rotary door operator according to claim 8 further including a mounting member having at least one mounting portion, said mounting member attached to one of said mounting bracket and such structure of such transit vehicle.

16. A lock mechanism for a rotary door operator according to claim 8 wherein said at least one mounting tab is disposed integrally with one of said mounting bracket and said mounting member.

17. A lock mechanism for a rotary door operator according to claim 8 wherein said first blocking means having an orifice disposed at one end for receiving a supply of said fluid pressure, a lock piston adapted for motion in a locking direction by said biasing means, said lock piston adapted for motion in an unlocking direction by said fluid pressure, a shaft attached to said lock piston at one end, said shaft attached to said blocking member at a distal end, and an attachment means for attachment to one of said mounting bracket and said mounting structure.

18. A lock mechanism for a rotary door operator according to claim 17 wherein said fluid pressure is one of pneumatic and hydraulic.

19. A lock mechanism for a rotary door operator according to claim 17 further including a supply valve for enabling a flow of said fluid pressure from a fluid pressure source, a control valve in a fluid pressure line for regulating a flow direction of said fluid pressure and a slow start valve disposed in said fluid pressure line intermediate said supply valve and said control valve for regulating a speed of said fluid pressure flow.

20. A lock mechanism for a rotary door operator according to claim 8 further including a cover attached to said rotary door operator.

21. Lock mechanism for a rotary door operator according to claim 8 further including a sensing switch engageable with said third surface of said second abutment means for communicating a lock condition status to a control system of such transit vehicle.

22. A lock mechanism for a rotary door operator according to claim 8 wherein said first biasing means is a bias spring.

23. A lock mechanism for a rotary door operator according to claim 1, wherein said blocking means is one of a cylinder and a solenoid.

* * * * *